July 6, 1954   L. J. EVANS   2,682,926
AUTOMATIC VARIABLE PITCH PROPELLER
Filed March 20, 1950   2 Sheets-Sheet 1
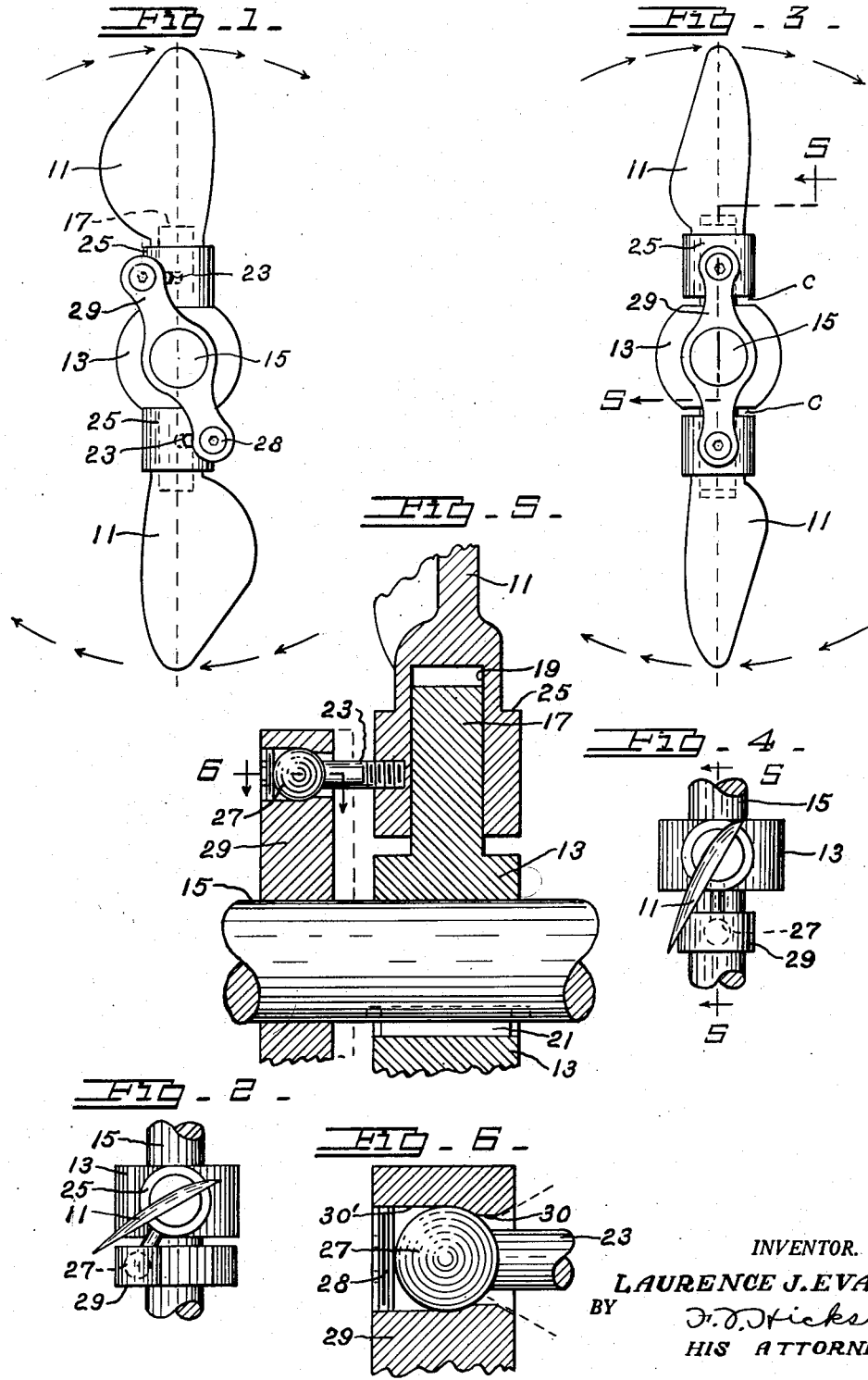
INVENTOR.
LAURENCE J. EVANS
BY
HIS ATTORNEY July 6, 1954 L. J. EVANS 2,682,926
AUTOMATIC VARIABLE PITCH PROPELLER
Filed March 20, 1950 2 Sheets-Sheet 2
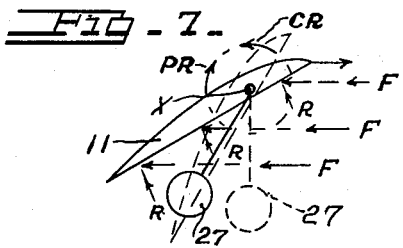
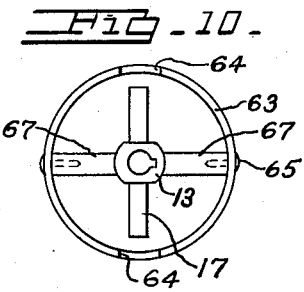
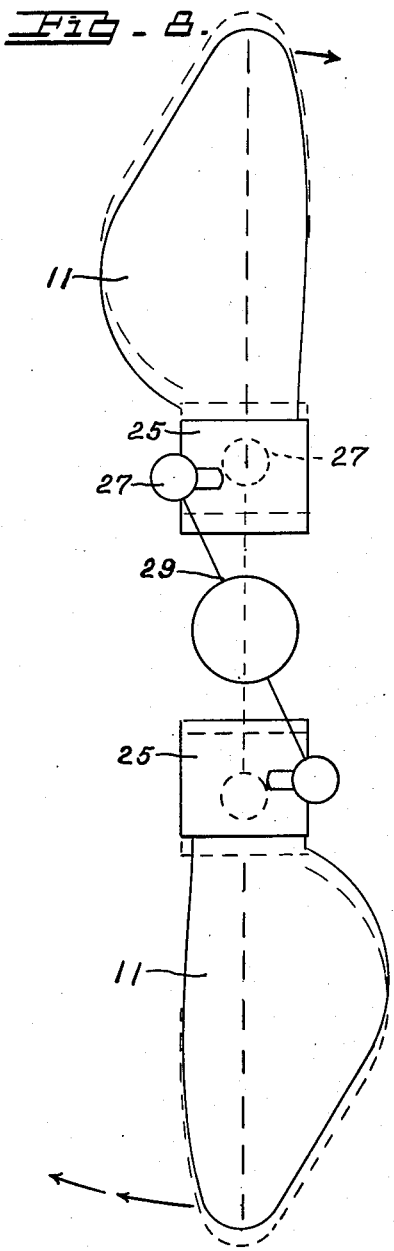
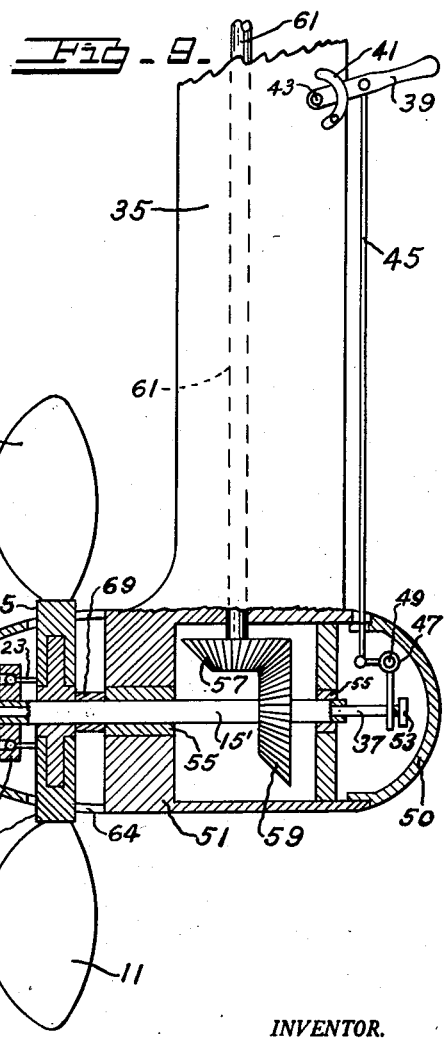
INVENTOR.
LAURENCE J. EVANS
BY *T. T. Hicks*
HIS ATTORNEY Patented July 6, 1954

2,682,926

UNITED STATES PATENT OFFICE 2,682,926

AUTOMATIC VARIABLE PITCH PROPELLER

Laurence J. Evans, Detroit, Mich.

Application March 20, 1950, Serial No. 150,724

1 Claim. (Cl. 170—160.11)

The invention pertains to variable pitch propellers and more particularly to propellers which automatically adjust and set the pitch of the blades in accordance with the different operating conditions to which the propeller is subjected, without further attention from the operator.

In the operation of a marine propeller, for example, it may happen that the propeller is frequently part way out of the water and at such times the engine tends to race. Then when the racing propeller is again suddenly immersed there is a shock with additional undesirable strain and vibration. But my automatic variable pitch propeller, by increasing the pitch of the blades with increasing speeds, tends to eliminate or greatly reduce such adverse operations. There is then less strain on the propeller driving shaft and mechanism with less vibration and racing of the engine. Also there is less likelihood of shearing the pin or breaking the shaft, when hitting bottom with such a variable pitch propeller. Also such a propeller will give higher speeds to heavily loaded boats and will provide much better acceleration than fixed bladed propellers. For trolling and slow speeds, my automatic variable pitch propeller is especially advantageous as the motor speed does not have to decrease to a point where the motor will be rough running or might stall.

It is accordingly an object of my invention to provide an automatic variable pitch propeller of a rugged construction which is simple to manufacture, install and maintain, and which will be reliable in operation.

It is also an object of my invention to provide such an automatic variable pitch propeller which can be provided with balanced operation characteristics and which is readily adaptable to be suitably proportioned for a wide range of uses and operating conditions for marine or aircraft operation.

It is a further object of my invention to provide such an automatic variable pitch propeller which embodies convenient manual adjusting means so that the operating characteristics can be varied and set as desired by the operator for different operating conditions, after which the operation of the propeller continues to operate and vary its pitch automatically, without further attention from the operator.

Another object of my invention is to provide such an automatic variable pitch propeller having but few parts.

Further objects and advantages are within the scope of the invention, such as relate to the arrangement, operation and function of the related elements of the structure, to various details of construction and to combinations of parts, elements per se, and to economies of manufacture and numerous other features as will be apparent from a consideration of the specification in conjunction with the drawings disclosing specific embodiments of the invention, wherein similar reference characters are applied to corresponding parts throughout, and in which:

Fig. 1 is a front elevational view showing the automatic variable pitch propeller, in accordance with my invention, and showing the blades set in the minimum pitch position;

Fig. 2 is a plan view thereof, still showing it set for minimum pitch;

Fig. 3 is a front elevational view similar to Fig. 1 but set in the maximum pitch position;

Fig. 4 is a plan view thereof also showing the maximum pitch position;

Fig. 5 is an enlarged fragmentary sectional view taken on line 5—5 in Figs. 3 and 4, and partially broken away for more clearly showing the cooperative elements;

Fig. 6 is an enlarged sectional view taken on line 6—6 on Fig. 5;

Figs. 7 and 8 are diagrammatic views for more clearly showing and explaining the operation of the propeller;

Fig. 9 is a side elevational view, partially broken away and sectioned, showing the lower portion of an outboard motor unit equipped with my improved propeller and also showing manual adjusting or setting means thereon; and Fig. 10 is a front elevational view showing the hub of Fig. 9.

Referring more specifically to the Figs. 1 through 6 of the drawings, I have illustratively disclosed an embodiment of my automatic variable pitch propeller which comprises propeller blades 11 mounted movably at the inner ends upon a hub 13 secured upon a drive shaft 15, which passes therethrough. The hub and the inner ends of the blades mounted thereon are cooperatively conformed so that the blades are supported by the hub for driving and power transmitting operation in a fluid medium in a manner to be free for rotation on their respective axes while also being slidable in toward the hub or outward from the hub. One manner in which this may be readily accomplished is by providing the hub with outwardly projecting pivot shafts 17 and providing bearing apertures 19 in the inner ends of the blades 11 which slide freely on the hub pivot shafts, as shown. The hub 13 may be a solid annular ring or collar which may be made as a casting having the pivot shafts 17 cast integral therewith. Or, if preferred, these pivot shafts may be separate members inserted and secured into the hub ring in any suitable manner, as by threading therein, as will be readily understood. The hub 13 is secured upon the propeller shaft or drive shaft 15 as by a key 21, or in any customary manner.

A holding arm 23 is provided projecting laterally from the inner end of each blade, which may have a reinforcing collar or flange 25 formed or cast integral therewith to receive and hold the arm threadably secured therein. This holding arm is so positioned on the blade that when the arm is turned to a position parallel to the drive shaft the blade is rotated to a position for the maximum pitch to be provided. The outer ends of these arms terminate in universal coupling balls 27.

A holding and actuating member or link 29 is provided which is centrally apertured for free rotation and axial sliding on the drive shaft 15 adjacent the hub. The ends of this link project in opposite directions to positions adjacent the inner ends of the propeller blades for operative engagement with the holding arms 23. For this purpose the ends of the link 29 are provided with apertures 30 extending through and having enlarged counterbores 30' opening away from the hub, and providing universal mounting sockets for the balls 27. In assembly, the balled arms 23 are inserted into the ends of the link 29 through the larger ends of these apertures 30' and screwed into the threaded holes in the flanges 25 on the inner end of each blade. By a threaded plug 28 the balled end 27 of each arm is held for universal movement in this counterbore or socket 30'. The end of the smaller aperture 30 toward the hub may be opened wide to permit ample angular rocking movement of the holding arm 23, as shown in Fig. 6.

When centrifugal force throws the propeller blades 11 outward, the holding arms 23 pull out on opposite ends of the link 29. This pulls the link to line up into alignment with the blades and this rotates the blades to the position for maximum pitch, as shown in Figs. 3 and 4, and as represented diagrammatically in Fig. 8. In Fig. 7 the arcuate arrow CR designates this direction of rotation. Conversely as the blades move in toward the hub, the link 29 is pushed away out of alignment and this rotates the blades 11 in the opposite direction to a position of minimum pitch, as shown in Figs. 1 and 2. This movement out of alignment is caused by the fluid pressure on the blades which are shaped so as to have a larger area on the trailing edge. This may be seen in Figs. 1 and 8 where the center or axis of the blade is represented by the dotted line, or in Fig. 7 where this axis is represented by the small circle $x$. In Figs. 1 and 8 the arcuate arrows represent the direction of rotation of the propeller blades. In diagrammatic view Fig. 7, substantially a plan view of the propeller, the straight arrow from the leading edge of the blade 11 represents the apparent direction of motion of the blade, while the dotted line arrows F represent the impingement of the surrounding fluid upon the blade. The inclined arrows R represent the resultant pressure upon this surface of the blade which has a larger area on the trailing side of the axis X of the blade and this tends to rotate the blade on its axis X in a clockwise direction, as represented by arcuate arrows PR in Fig. 7. As this fluid pressure tends to turn the blades in the direction of this larger area for minimum pitch the holding arms 23 push the ends of the link 29 away from the aligned position which in turn draws the propeller blades in toward the hub. It will be seen that in Fig. 1, there is no clearance between the inner ends of the blades. But in Fig. 4, where the blades are shown in outward positions, it will be seen that there is a clearance space C shown between the inner ends of the blades and the hub.

By making this trailing edge area of each blade greater or smaller, it is possible to select suitable magnitude of the forces tending to turn the blade to the decreased pitch position. As this force opposes the centrifugal force tending to throw the blades outward, and the latter varies with the weight and speed of the blade, it is a matter of choice and selection by tests to properly balance these forces in order to attain the desired operating characteristics of the propeller to adjust its pitch automatically to suit the operating condition for which the propeller is being provided.

If it is preferred that these operating characteristics should be variable at the will of the operator and instead of being permanently limited by the original selection of these dimensions by the manufacturer, this may be accomplished by providing manual means whereby the operator may adjust the characteristics of the propeller to suit different operating conditions in use.

In Fig. 9 such an arrangement is shown comprising a compression spring 31 disposed to apply tension upon the holding link 29 for biasing it toward the hub 13 and having an adjustable back stop 33 for adjusting this spring tension. The installation represented is the lower portion of the leg or engine shaft casing 35 of an outboard motor unit having the improved automatic variable pitch propeller secured on the propeller shaft 15'. For compactness, and to make it as much self contained as possible, the drive shaft 15' is made hollow and the back stop 33 is supported as one end of a rod 37 which extends loosely through the drive shaft for axial movement from a hand lever 39 pivotally mounted at a convenient position on an upper portion of the shaft casing 35, where it is held in adjusted position by any customary lever latching or holding arrangement, such as a friction plate 41 drawn thereto by a bolt 43. From this hand lever 39 a rod 45 connects to one arm of a bellcrank 47 pivoted on a pin 49 in the removable end 50 of the gear housing 51, which is provided as usual on the lower end of the vertical shaft casing 35 of the outboard motor unit. The other arm of the bell-crank, which may be forked, engages a cap 53 on the adjacent end of the rod 37 so that actuating the bell-crank counterclockwise, as viewed in Fig. 9, pulls the rod 37 and thereby moves the back stop 33 to compress the spring 31 and to apply an increased biasing force tending to push the actuating link 29 toward the hub. By setting the lever 39 and varying the amount of this biasing force in this manner, the automatic pitch varying characteristics of the propeller are altered and the propeller continues its operation accordingly, without any further attention from the operator.

As usual with outboard motor units, the horizontally disposed propeller or drive shaft 15' is supported in bearings 55 provided in the gear housing 51. By suitable power transmitting connection, such as bevel gears 57 and 59 for example, driving power is received from the lower end of a vertical engine shaft 61 which extends up through the vertical shaft casing 35, which is broken away at the upper end. As usual with outboard motor units, a suitable power source such as an internal combustion engine (not shown), is provided on the upper end of this shaft casing 35 which is also provided with a suitable mounting clamp and bracket (not shown) for attaching the outboard motor unit on the rear end of a boat with the propeller immersed in the water, in a well known manner. A protective center cap 63 is provided which fits over the center of the propeller and encloses the mechanism. This cap has slots 64 to pass freely around the inner ends of the propeller blades, and it is secured, as by screws 65 passed into outstanding lugs 67 projecting from the hub 13, as may be seen in Fig. 10. The rear edges of this cap 63 fit fairly closely but freely adjacent the leading edges of the gear housing 51.

Although I have shown my invention as embodied in a two-bladed propeller, the same principles are as readily utilized in a propeller having three, or four or more blades, as this only requires that the hub 13 be provided with a corresponding number of the outwardly projecting pivot shafts, and that the actuating and holding link 29 be a member made of a suitable triangular, circular or other shape, having a corresponding number of socket apertures in which the holding arms may be universally attached for holding and controlling the movements of all the blades so provided.

It will be seen that in a simple rugged construction I have provided an automatic propeller which varies its pitch automatically in accordance with changing operating conditions so as to most effectively utilize the power of the engine and to avoid undue vibration, stress and shock under different operating conditions.

It is apparent that within the scope of the invention modifications and different arrangements may be made other than disclosed herein, and the present disclosure is illustrative merely, the invention comprehending variations thereof.

What is claimed as the invention is:

In an automatic variable pitch propeller the combination of, a drive shaft, a hub secured upon said shaft with the shaft extending through the hub, a plurality of propeller blades, means mounting said blades on said hub for rotary movement and for axial movement toward or away from the hub, an actuating link having extended ends and an apertured central portion mounted for free rotation and slidable movement upon said shaft adjacent said hub, arms projecting laterally from the inner ends of said blades into operative engagement with the ends of said link at points which are out of alignment when the blades are in toward the hub to limit the outward movements of the blades and to set the blades to various rotated positions for adjusting the pitch of the propeller in accordance with the axial positions of the blades as centrifugal force tends to throw the blades outward, said blades having larger fluid contacting surfaces toward the trailing edges so that the fluid pressures impart a force tending to rotate the blades in the opposite direction from the action of centrifugal force thereon, a compression spring disposed concentrically to said drive shaft for applying a biasing pressure on said link tending to push the link to slide toward the hub, a manually adjustable rod sliding axially through the drive shaft and said spring, and a spring back stop on the end of said rod for adjusting the pressure of the back stop on the spring and thereby the pressure of the spring on said link in accordance with the automatic operating characteristics desired in said automatic variable pitch propeller.

References Cited in the file of this patent
UNITED STATES PATENTS

| Number | Name | Date |
| --- | --- | --- |
| 1,820,742 | Hewitt | Aug. 25, 1931 |
| 1,931,710 | Smith et al. | Oct. 24, 1933 |
| 2,099,922 | Bellman | Nov. 23, 1937 |
| 2,308,749 | Gee | Jan. 19, 1943 |
| 2,417,917 | Everts | Mar. 25, 1947 |
| 2,457,731 | Roby | Dec. 28, 1948 |